(12) United States Patent
Egan et al.

(10) Patent No.: US 7,317,586 B1
(45) Date of Patent: Jan. 8, 2008

(54) METHODS AND STRUCTURE FOR GENERAL PURPOSE INTERVAL ACCUMULATING FILTER FOR MEASURING OPERATIONAL PARAMETERS OF A DIGITAL READ CHANNEL

(75) Inventors: Curtis Egan, Thornton, CO (US); Christine Green, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 225 days.

(21) Appl. No.: 11/146,909

(22) Filed: Jun. 7, 2005

Related U.S. Application Data

(60) Provisional application No. 60/577,731, filed on Jun. 7, 2004.

(51) Int. Cl.
    *G11B 5/09* (2006.01)
(52) U.S. Cl. .......................................................... 360/39
(58) Field of Classification Search .................. 360/39, 360/51, 53, 67, 25, 40, 46, 43; 714/719; 375/229, 376; 708/319; 323/315
See application file for complete search history.

(56) References Cited

U.S. PATENT DOCUMENTS

| | | | | |
|---|---|---|---|---|
| 5,563,746 A | * | 10/1996 | Bliss | 360/53 |
| 5,572,558 A | * | 11/1996 | Beherns | 375/376 |
| 5,754,353 A | * | 5/1998 | Behrens et al. | 360/53 |
| 5,761,212 A | * | 6/1998 | Foland et al. | 714/719 |
| 5,784,296 A | | 7/1998 | Baker et al. | 364/551.01 |
| 5,786,951 A | * | 7/1998 | Welland et al. | 360/46 |
| 5,812,334 A | * | 9/1998 | Behrens et al. | 360/40 |
| 5,949,820 A | * | 9/1999 | Shih et al. | 375/229 |
| 5,987,634 A | * | 11/1999 | Behrens et al. | 714/719 |
| 6,005,731 A | * | 12/1999 | Foland et al. | 360/53 |
| 6,154,017 A | * | 11/2000 | Contreras | 323/315 |
| 6,219,192 B1 | * | 4/2001 | Gopalaswamy et al. | 360/25 |
| 6,621,649 B1 | * | 9/2003 | Jiang et al. | 360/67 |
| 6,816,328 B2 | * | 11/2004 | Rae | 360/51 |
| 7,127,481 B1 | * | 10/2006 | Lam | 708/319 |

\* cited by examiner

*Primary Examiner*—Fred F. Tzeng
(74) *Attorney, Agent, or Firm*—Westman, Champlin & Kelly

(57) ABSTRACT

Methods and structures for a general purpose, discrete time sample, interval accumulating filter for measuring any of a plurality of parameters associated with operation of a digital read channel. The general purpose interval accumulating features and aspects hereof permit flexible configuration for measuring a variety of operational characteristics and parameters of a digital, discrete time sample, read channel. The interval accumulating filter may sense harmonic frequencies associated with mechanical and electrical noise in the read channel operation. Other features and aspects hereof permit monitoring of multiple signal frequencies of a read channel in a disk drive, error recovery of a bad sector in a disk drive, and measurement of numerous other operational aspects of a discrete time digital sample read channel.

18 Claims, 6 Drawing Sheets

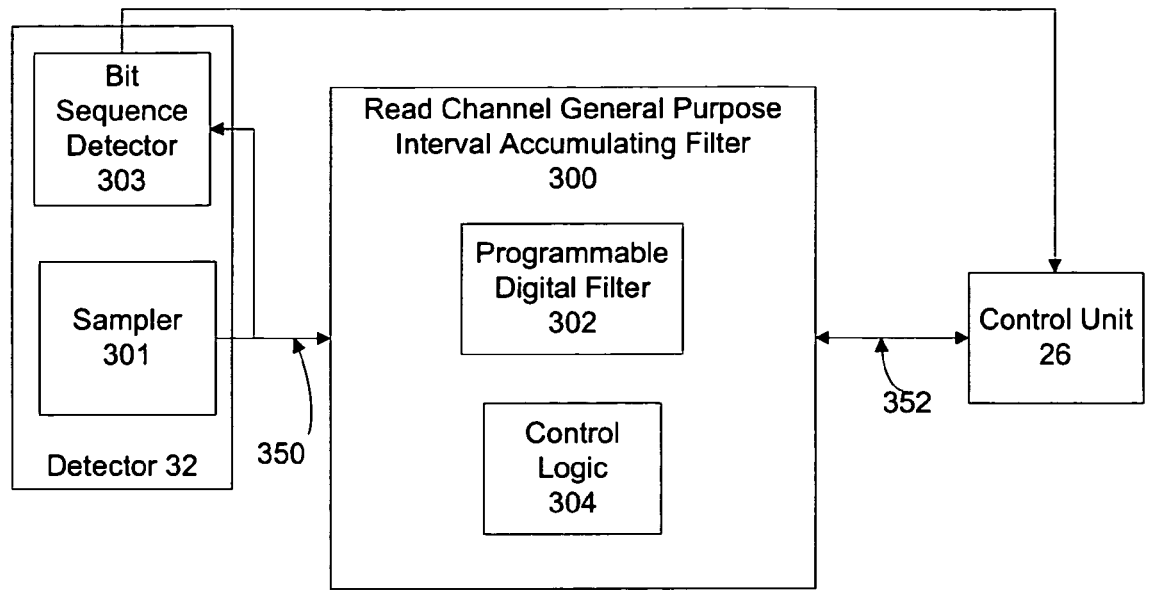
FIG. 3
FIG. 4
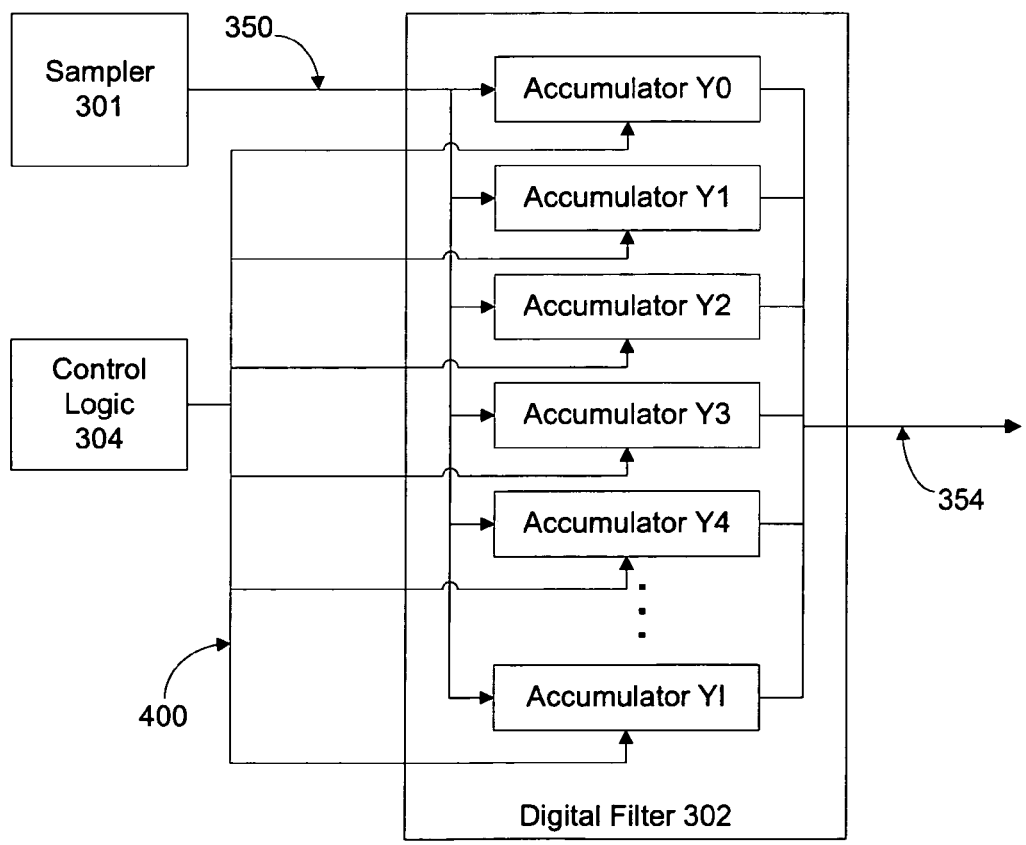

Program Control Logic to Configure Accumulators for Sensing Operational Parameters
600

Operate Accumulators as Configured to Sense Operational Parameters
602

METHODS AND STRUCTURE FOR GENERAL PURPOSE INTERVAL ACCUMULATING FILTER FOR MEASURING OPERATIONAL PARAMETERS OF A DIGITAL READ CHANNEL

RELATED PATENT APPLICATION

This patent application is related to and claims priority to U.S. Provisional Patent Application Ser. No. 60/577,731 filed 7 Jun. 2004 and entitled: General Purpose Interval Accumulating Filter which is hereby incorporated by reference. This patent application is also related to U.S. Pat. No. 5,784,296 issued Jul. 21, 1998 to Baker et al., and entitled Method and Apparatus for Spectral Analysis in a Disk Recording System which is hereby incorporated by reference and which is hereinafter referred to as "Baker".

BACKGROUND OF THE INVENTION

1. Field of the Invention

The invention relates generally to disk drive control structures and techniques and in particular relates to improved methods and structures for measuring digital sampled values from a read channel of a digital communication channel (such as a disk drive read channel) to measure various operational parameters of the read channel. The methods and structures generally include flexible programmable structures for selectively accumulating digital sampled values during operation of the read channel.

2. Discussion of Related Art

Present-day storage systems and other data storage or communication applications, sense recorded or transmitted data encoded as digital information. The encoded digital information is stored or transmitted as analog pulse signals stored on a recording surface or transmitted through a communication medium. The pulses are demodulated and decoded to reproduce the stored or communicated information. Typically, such a digital communication channel includes a read channel component used for receiving the analog pulse waveforms, for converting the analog information to discrete time sampled digital values, and for decoding the original stored or communicated data from the discrete time sample values. In general, such a read channel therefore generally includes an analog to digital converter component for generating a sequence of discrete time sample values and includes digital decoding logic for detecting data or information derived from the digital discrete time sampled values.

Numerous analog filter structures and digital filter structures may be included through the communication paths representing the read channel to improve quality of the signal processing and the data decoding processing features. A process of decoding the digital information from discrete time sampled signals typically entails discrete Fourrier transforms to extract and isolate numerous superposed signals including the desired data signal as well as harmonics and noise caused by various mechanical and electrical characteristics of the system applying the read channel.

Due to the analog nature of the underlying modulated signal, it is frequently useful to adjust or tune various filters in the read channel operation to optimize the quality of signal demodulation and decoding. In performing such optimizations, is often useful to filter out harmonic signals using discrete Fourrier transforms and to identify other operational parameters associated with the read channel operation. Measurements useful for these optimizations may be obtained utilizing external analyzers such as spectrum analyzers to determine the spectral content of the underlying modulate it signal. Obtaining and utilizing an external spectrum analyzer for such purposes is both inconvenient and costly. Using an external analyzer is inconvenient in that an external device must be utilized and in some manner coupled to the underlying system without itself impeding or altering operation of the underlying system. Further, such devices are often extremely costly such that evaluating and optimizing multiple read channel devices simultaneously, such as in a manufacturing test and calibration environment, can be a can represent a significant cost.

One prior solution taught by Baker proposes a device referred to as a harmonic sensor. The harmonic sensor structure of Baker receives the sequence of digital, discrete sampled values in a circuit integrated with, or tightly coupled with the read channel logic and is adapted to accumulate the discrete signal samples at predetermined intervals to thereby determine harmonic signal aspects of the sensed information. In this Baker solution, the modified read channel circuit is used to perform spectral analysis to identify harmonics within the sampled signal. Though the Baker solution provides some capabilities for integrated spectral analysis within the read channel circuit, the solution is limited in terms of its flexibility and potential measurements.

It is evident from the above discussion that an ongoing need exists for improved spectral analysis features integrated within, or tightly coupled to, read channel circuitry in a digital communication system.

SUMMARY OF THE INVENTION

The present invention solves the above and other problems, thereby advancing the state of the useful arts, by providing methods and structures for a more flexible, programmable, general purpose interval accumulation filter to permit a wider variety of measurements of operational parameters for a read channel in a digital communication system such as a disk drive or other digitally encoded communication system. More specifically, features and aspects hereof may include a plurality of accumulators and associated programmable control logic for determining the period of sample accumulation in each accumulator, an initial offset to delay commencement of the accumulation, and other programmable features to permit flexible configuration and resultant flexibility in measuring a variety of operational parameters of the digital read channel.

A first feature provides a circuit for use with a read channel where the read channel produces sequences of discrete time digital sample values for use in a digital communication channel. The circuit includes a digital filter adapted to receive the sequences of discrete time digital sample values and to controllably measure a selected operational parameter of a plurality of operational parameters of the digital communication channel. The circuit also includes control logic coupled the digital filter adapted to controllably reconfigure operation of the digital filter to measure the selected operational parameter of the digital communication channel.

Another feature provides a method for sensing operational parameters of a read channel in a digital communication system that includes a plurality of accumulators coupled to the read channel to receive a sequence of discrete time sample valued from the read channel, and includes control logic coupled to the plurality of accumulators to controllably enable and disable each accumulator of the plurality of accumulators to accumulate a next discrete time sample value of the sequence of discrete time sample values. The method includes programming the control logic to operate the plurality of accumulators to measure a selected operational parameter of a plurality of operational parameters of the read channel; and operating the plurality of accumulators to sense the selected operational parameter of the read channel.

Still another feature provides a disk drive having a rotatable recording surface and having a digital discrete time sample read channel and further including a read channel monitor coupled to the read channel and adapted to controllably monitor any selected operational parameter of multiple operational parameters of the read channel. The read channel monitor includes a plurality of accumulators wherein each accumulator is coupled to receive a current discrete time digital sample value from the read channel and is adapted to accumulate the current discrete time digital sample value with previously received discrete time digital sample values. The read channel monitor also includes a programmable control logic adapted to controllably generate a plurality of control signals and coupled to apply each of the control signals to a corresponding accumulator of the plurality of accumulators to enable accumulation operation by the corresponding accumulator to thereby monitor the selected operational parameter.

BRIEF DESCRIPTION OF THE DRAWINGS

FIG. 3 is a block diagram of an exemplary interval accumulating digital filter enhanced in accordance with features and aspects hereof to permit monitoring of selected operational parameters of a plurality of operational parameters of a digital communication system.

FIG. 4 is a block diagram providing additional details of an exemplary digital filter design in for the filter of FIG. 3 in accordance with features and aspects hereof.

DETAILED DESCRIPTION OF THE DRAWINGS

Figure 1:
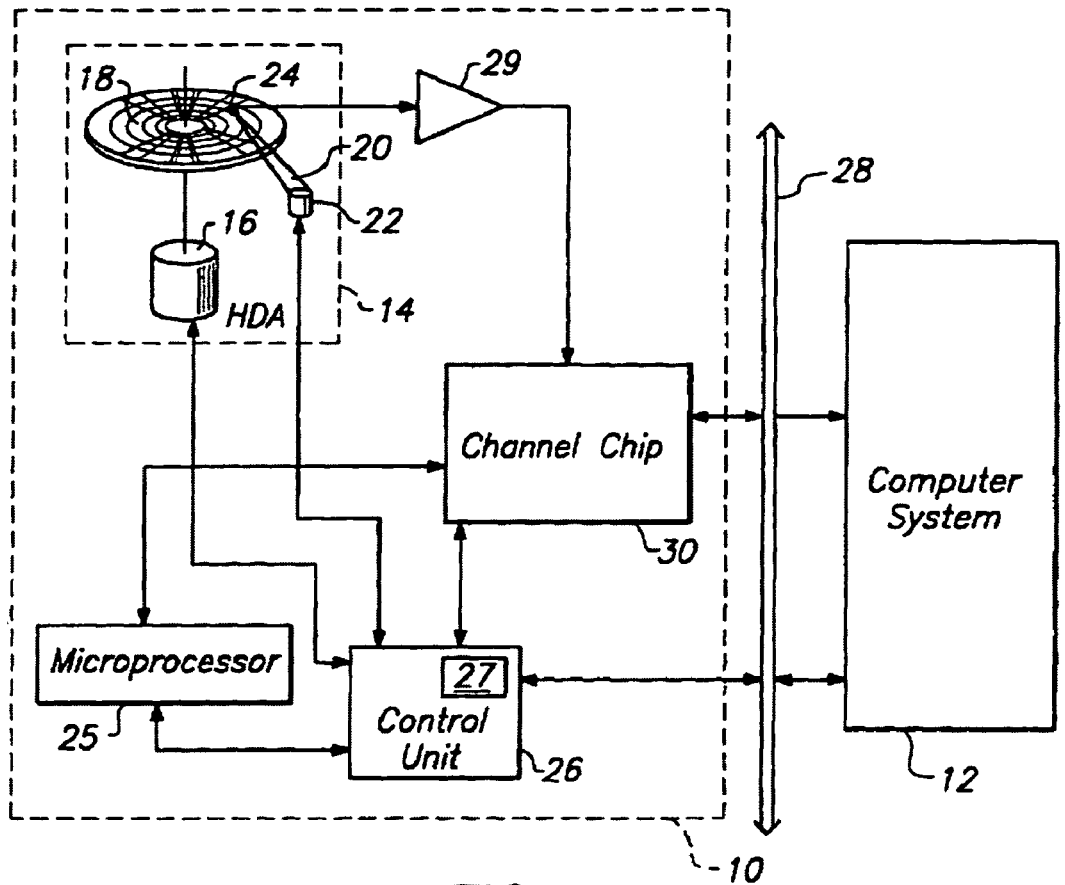
FIG. 1 is a block diagram of an exemplary disk drive system as presently known in the art that uses accumulators to monitor a single operation parameter of the digital read channel of a disk drive system.

FIG. 1 shows an exemplary system 10 incorporating features and aspects as known in the art to permit measurement of a single operational parameter of a digital communication system read channel. The exemplary system 10 of FIG. 1 represents a disk drive as disclosed in Baker which is hereby incorporated by reference. The disk drive system 10 of FIG. 1 shows a read channel chip 30 within the disk drive 10 coupled to a read head transducer 24 controllably positionable by actuator assembly 20 and actuator motor 22. The channel chip 30 receives the sensed analog signal from transducer (read head) 24 through amplifier 29 and converts the analog signal into a sequence of discrete time digital sampled values. Control unit 26 including a control processor 27 controls dataflow between an attached host computer system 12 via interface 28 and also controls operation of channel chip 30 for sensing harmonic frequencies in operation of the disk drive system 10.

Figure 2:
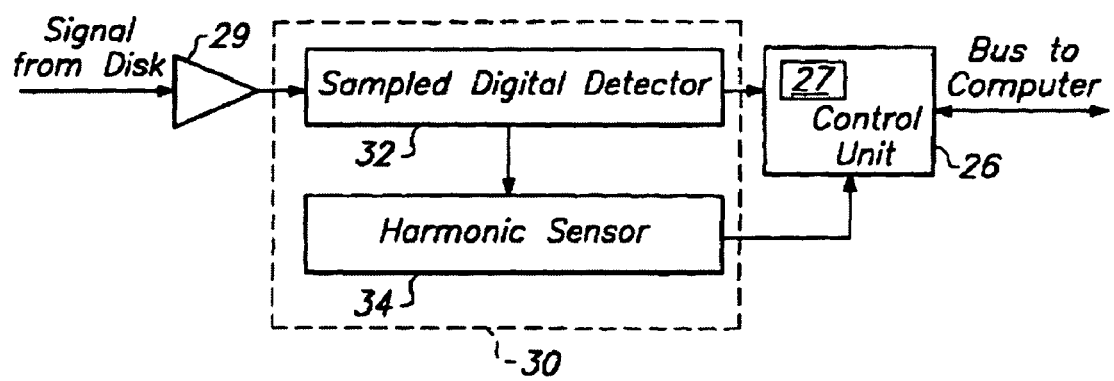
FIG. 2 is a block diagram describing additional details of an exemplary structure for the digital filter features as presently known in the system of FIG. 1.

FIG. 2 provides some additional detail of a simplified version of channel chip 30 as presented in Baker. Sampled digital detector 32 performs the analog to digital conversion and discrete time sampling of the analog signal from the read head received through amplifier 29. The sequence of discrete time digital sampled values is applied to control unit 26 for decoding of the data contained therein. Within detector 32 is circuitry to perform analog to digital conversion of the raw analog signal sensed by the transducer 24. Also within detector 32 are various analog and digital filters for equalizing the signal for quality purposes. Discrete time digital sampled values are generated by the analog to digital converter (with any analog and digital equalization filtration applied). These discrete time digital sampled values are applied to the harmonic sensor of Baker to provide measurements described in Baker for calculating the spectral content of the received read signal. Lastly, included within the detector 32 of Baker is a bit sequence detector to detect the encoded bits encoded within the discrete time digitized sampled values.

Those of ordinary skill in the art will readily recognize that channel chip 30 of Baker may be applied to numerous other digital communication system applications in addition to the depicted disk drive system 10. Application of such a read channel in a disk drive system 10 is therefore merely intended as one exemplary useful application of such a read channel.

As taught in Baker, the harmonic sensor utilizes one or more accumulator registers to accumulate the values of a fixed pattern of repeating discrete time digital sample values. The structures and methods disclosed by Baker fails to suggest a more flexible programmable configuration to permit the selective sensing and measurement of one or more of a plurality of operational parameters of the read channel (and hence of the underlying digital communication system). Rather, Baker teaches an essentially static structure designed to measure a single operational parameter of the read channel or underlying digital communications system. Specifically, Baker measures harmonic content or distortion of a given periodic waveform. Though this is a valuable measurement, features and aspects hereof provide enhanced programmability to permit monitoring and measurement of numerous other operational parameters of the digital communication system.

FIG. 3 is a block diagram describing features and aspects hereof providing an improved read channel interval accumulating filter 300 adapted to permit flexible reconfiguration of the operation of the plurality of accumulators to thereby permit measurement of any of a plurality of operational parameters of the read channel. A discrete time sampler element 301 provide the analog to digital conversion and equalization filtration features as discussed above with respect to FIG. 2. The discrete time digital sampled values are then applied both to the interval accumulating filter 300 and to the bit sequence detector 303, both via path 350.

In general, read channel interval accumulating filter 300 includes programmable digital filter 302 and associated control logic 304. Though shown as two distinct elements, programmable digital filter 302 and control logic 304 may be implemented as tightly coupled integrated circuitry as well as discrete modules as a well known matter of design choice. As in Baker, the programmable digital filter 302 generally comprises a plurality of accumulators configured to operate according to configuration provided by control logic 304. Control unit 26 may communicate the desired configuration via path 352 and control logic 304 may configure the programmable digital filter 302 and associated logic to perform the requested measurement of an identified operational parameter. The information accumulated by programmable digital filter 302 as configured and operated by control logic 304 may then be returned to control unit 26 via path 352 for further processing to evaluate performance of the underlying digital communication system.

FIG. 4 provides some additional details of exemplary structure and operation of digital filter 302. Digital filter 302 of FIG. 3 may include a plurality of accumulator registers Y0 through YI. Each accumulator Y0 through YI receives a next discrete time digital sample value from the sampler 301 via path 350. Control logic 304 may include logic to selectively enable an appropriate accumulator Y0 through YI to accumulate each received discrete time sample value. The particular accumulator register Y0 through YI associated with accumulating each particular discrete time digital sample value may be determined by control logic 304 based upon the appropriate configuration to achieve monitoring of a particular subset of operational parameters of the read channel. Upon completion of the desired measurements, control logic 304 may cause accumulators Y0 through YI to forward the resulting accumulated values by path 352 to other control elements (not shown) for further post processing.

Accumulators Y0 through YI may represent any suitable accumulating register structure as well known in the art. Under control of control logic 304, each accumulator register Y0 through YI may be selectively enabled to accumulate the next received discrete time digital sample values using addition and/or subtraction arithmetic. As discussed further herein below, by appropriately, selectively enabling and disabling each accumulator Y0 through YI, any of numerous operational parameters may be sensed or measured by the digital filter 302. Specific examples of configuration and operation of such a digital filter are provided further herein below. FIG. 4 is therefore intended merely as exemplary of one possible exemplary structure for digital filter 302. Numerous equivalent implementations will be readily apparent to those of ordinary skill in the art. Further, the particular number of such accumulators may be determined in accordance with the needs of a particular digital communications system and the operational parameters thereof to be measured. As noted further herein below, modulo arithmetic may be utilized in control logic 304 to appropriately sequence the enabling and disabling of accumulators Y0 through YI. Hence, the number of such accumulators Y0 through YI may preferably be a power of 2 to thereby simplify the modulo arithmetic computations to enable use of simple binary logic functions to perform desired modulo arithmetic. Such design choices are well known to those of ordinary skill in the art.

Figure 5:
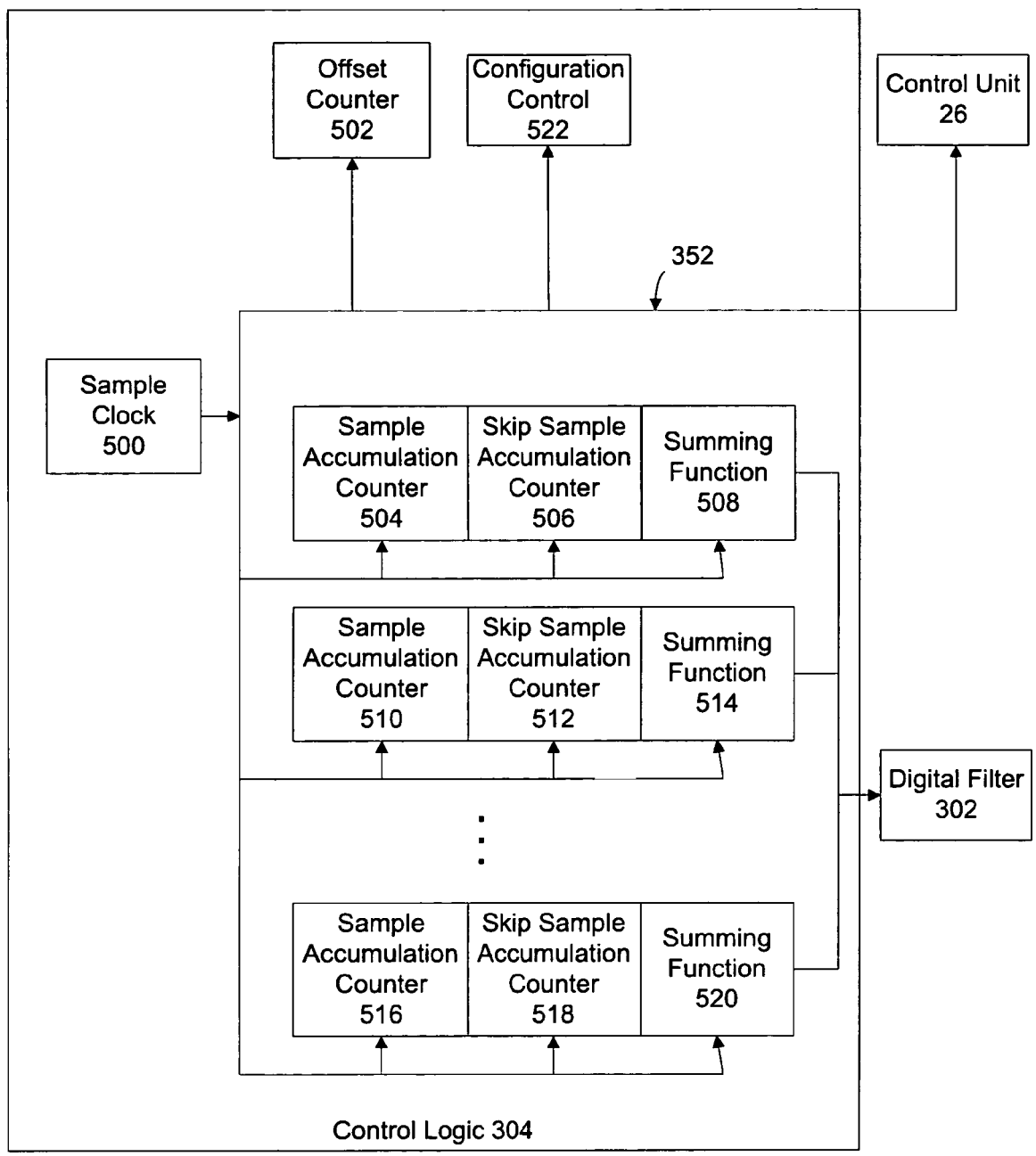
FIG. 5 is a block diagram providing additional details of exemplary control logic in accordance with features and aspects hereof and as shown in FIG. 3.

FIG. 5 is a block diagram providing additional details of an exemplary embodiment of control logic 304 of FIG. 3 above. As noted above, control unit 26 may request monitoring of a particular operational parameter or multiple such operational parameters and may communicate the desired mode of operation via path 352 to control logic 304. Configuration control logic 522 generally may receive such a request from control unit 26 and suitably programs a number of counters used for determining the number of discrete time digital sample values to be applied to particular associated accumulators to thereby measure the desired operational parameter or parameters.

In general, discrete time sample values are sampled at a time indicated by a sample clock signal 500. As generally known in the art, the sample clock may be a fixed frequency signal associated with the communication medium of the digital communication system or may be derived from the received information stream utilizing, for example, digital lock loop (DLL) structures and methods. Regardless of the source of sample clock 500, discrete time digital sample values to be processed are received by control logic 304 (and by digital filter 302) coincident with the pulses of the sample clock 500.

Path 352 represents a communication path interconnecting control unit 26 with configuration control element 522 and interconnecting all other elements of control logic 304. Those of ordinary skill in the art will readily recognize numerous signal bus structures and signaling standards for coupling such devices within an integrated circuit design. Path 352 therefore represents any of several well-know techniques for interconnecting the various elements associated with configuring and operating the programmable digital filter features and aspects hereof. Numerous equivalent structures and partitionings of the various signals associated with configuration and control of the control logic and the digital filter with the readily apparent to those of ordinary skill in the art.

In accordance with a request from control unit 26, configuration control element 522 may program the offset counter 502 to commence operation of the various selected accumulators only after the specified number of discrete time sample values has been ignored by the digital filter 302. By suitably programming and reprogramming the offset counter, numerous operational parameters of the read channel may be measured by periodic changes to the offset counter register. By starting the accumulation operations at different offset starting points, various comparative measurements may be achieved for operation of the read channel.

In addition, control logic 304 may include a plurality of other counters and logic functions for further reconfiguration and operation of the plurality of accumulators in the digital filter. In one exemplary embodiment of features and aspects hereof, the various counter registers may be implemented as a plurality of pairs of registers. Each pair of registers may include a sample counter and a skip counter. The sample counter specifying a number of sequential discrete time samples to be accumulated in a corresponding subset of the accumulators followed by skipping a number of samples specified by the skip counter.

For example, as shown in FIG. 5, a first pair of counters, 504 and 506, indicate a first sample count for the number of samples to be accumulated followed by a first skip count for the number of samples to be skipped following that first sequence of accumulation. A second pair of counters represented as sample accumulation counter 510 and skip accumulation counter 512 may then indicate a second sequence of samples to be counted followed by a second sequence of samples to be skipped. In like manner, sample counter 516 and skip counter 518 specify yet another counter pair for specifying yet another sequence of samples to be accumulated and skipped, respectively. As discussed further herein below, any number of such pairs of registers may be provided in control logic 304 in accordance with the needs of a particular application for measuring operational parameters. In general, the flexibility provided by the multiple pairs of counter registers specifying alternating sequences of samples to be accumulated and samples to be skipped permits a rich complement of operational parameters to be monitored for a particular read channel application. Generally, such multiple pairs of counter registers permit operations that measure multiple frequencies of signals sensed by the read channel to thereby provide sensing and measurement for a wider variety of operational parameters.

Examples of the operational parameters that may be sensed by suitable configuration of control logic 304 may include: improved error recovery by monitoring location in a sector of erroneous information, monitoring of multiple frequencies in a single rotation of a disk medium relative to the read channel to reduce variations due to off-track positioning, and monitoring of multiple frequencies in a single rotation of a disk medium under a read head to determine flying height of a read head. These and other parameters of operation of a disk drive read channel or other digital read channel may be achieved applying features and benefits hereof as compared to prior solutions.

Specific examples of particular operational parameters and associated configurations are provided herein below.

In addition, control logic 304 may include programmable features to alter the summing function of individual accumulators or groups of accumulators associated with each counter register pair. The summing function 508, 514, and 520 may each specify whether the associated accumulators add or subtract discrete time digital sample values. Depending upon the particular operational parameter to be monitored, some values may be accumulated by addition while others may be an accumulated by subtraction. Still further, in particular applications, operational parameters may be determined by alternating sequences of addition and subtraction within a single accumulator or groups of accumulators. The summing function 508, 514, and 520 may therefore represent logic that enables addition or subtraction within the accumulator register itself or may represent additional logic external to the accumulator register to provide such a feature for a simpler addition accumulator register structure. Such additional logic may be implemented, for example, as a product junction that multiplies a next discrete time digital sample value by a fixed value of +1 or −1 before applying the resulting product as an input to a particular accumulator register. Those of ordinary skill in the art will readily recognize variety of implementations for providing such summing function control features.

Those of ordinary skill in the art will readily recognizable wide variety of embodiments providing the functions described by block diagram of FIG. 5 for control logic 304. Most generally, control logic 304 provides appropriate, combinatorial and boolean logic to count sequences of discrete time sample values based on the sample clock signal provided sample clock 500 and applies the generated control signals to enable and disable summing by the plurality of accumulators within digital filter 302. The enable and disable features generally represent control signals generated by control logic 304 and applied to the accumulators within digital filter 302. The control signals so generated are created in accordance with count values initially programmed in various counter registers and incremented or decremented by control logic 304. Thus, FIG. 5 is intended merely as a representative of numerous equivalent embodiments of features and aspects hereof to control the operation of the programmable digital filter's plurality of accumulators.

FIGS. 6 through 9 describe methods associated with features and aspects hereof to provide for flexible configuration of a programmable digital filter adapted to accumulate sequences of discrete time digital sample values from a read channel. The methods described herein may be implemented by suitably programmed instructions within a general or special purpose processor or may be implemented, as a matter of design choice, in custom combinatorial and boolean logic circuits.

Figure 6:
FIGS. 6-9 are flowcharts describing exemplary methods associated with features and aspects hereof to provide flexible configuration of a discrete time sample value interval accumulator to permit monitoring of any of multiple operational parameters of a read channel in a digital communication system.

FIG. 6 is a flowchart describing the high level operation of features and aspects hereof to provide for flexible reconfiguration of an interval accumulating digital filter to permit monitoring of one or more of a plurality of operational parameters of a read channel. Element 600 is first operable to program control logic features to configure the accumulators for sensing one or more desired operational parameters. As noted above, a higher level controller of the digital communication system may direct the programming of such control logic by requesting monitoring of one or more particular operational parameters from among a plurality of possible operational parameters that may be monitored. Further, such programming and configuration may be altered dynamically at any time during operation of the underlying digital communication system without impacting ongoing operation thereof.

Element 602 then operates the accumulators and control logic as configured by element 600 to sense the intended operational parameters of the read channel. As noted, operation of the accumulators may be reconfigured and restarted at any time during operation of the digital communication system to alter the operational parameters to be monitored. Thus, elements 600 and 602 may be iteratively repeated to appropriately reconfigure the control logic and associated accumulators for gathering information regarding different operational parameters.

Figure 7:
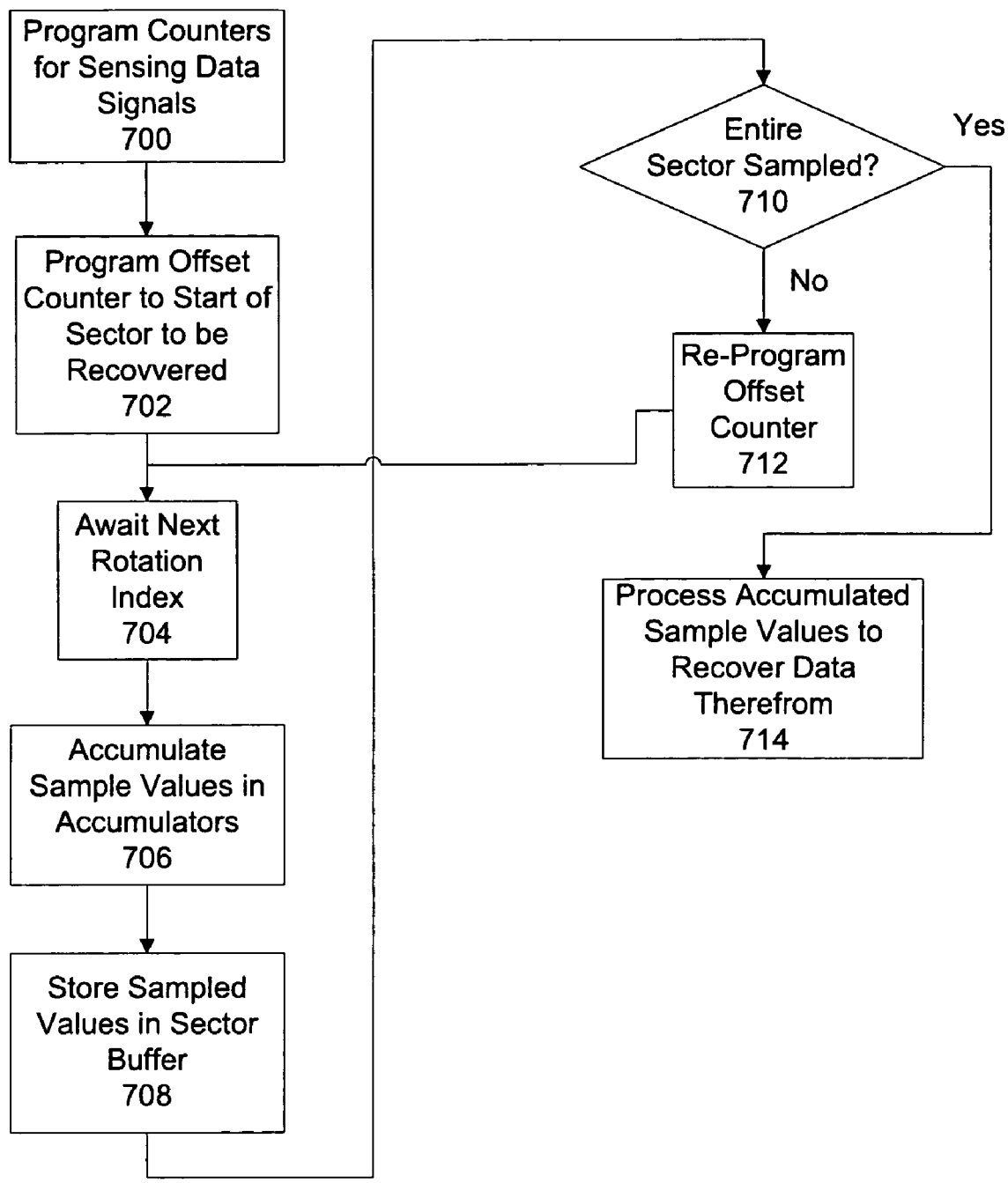

FIG. 7 is a flowchart describing a particular embodiment of a method to utilize the programmable interval accumulating digital filter in accordance with features and aspects hereof to assist in error recovery in, for example, a disk drive system (an exemplary digital communication application that utilizes a read channel for digitally encoded information). In a disk drive environment, a plurality of sectors or blocks of information are stored on a recordable medium, typically a rotating recordable medium, and read by a read head with associated read channel logic. Typically, sector or block information includes some error recovery capability to permit reading of data despite the presence of errors in the recorded medium or errors in the sensing of information recorded on the medium.

Despite such error recovery structures, some errors are more difficult to recover. Sometimes the recovery information stored with the data is insufficient to correct the errors without further information regarding the specific location of the possible error within the sector or block. By appropriately configuring and operating the interval accumulating digital filter features and aspects hereof, additional error recovery information may be derived to help correct the erroneous information. More specifically, the location of the suspect information within the sector or block may be determined.

In general, the method of FIG. 7 repeatedly accumulates sample values in the accumulators of the digital filter and offsets the starting position for the accumulation of samples on each rotation of the rotatable recording medium. By so moving the sample accumulation starting point in the sector or block, different portions of discrete time sampled values within the sector may be acquired by the accumulators of the digital filter. Flags indicating whether a particular portion of the samples represent an error may be associated with the buffered information as the interval accumulating filter accumulates the discrete time samples. The accumulated information representing the sampled discrete time values and the error flag information may then be buffered and provided to post processing features to retry error recovery armed with the additional information regarding location within the sector of suspect samples.

Element 700 is first operable to program a plurality of counters for sensing data signals as discrete time sampled values from the rotating recordable medium. As discussed further herein below, multiple such accumulators may be utilized to sample various discrete time digital sample values to reconstruct the shape of one or more pulses intended to represent recorded, encoded digital data on the rotating recordable medium. Following suitable programming of the counters for one or more accumulators to sample one or more data pulses, element 702 is operable to initially program the offset counter to an initial starting point for the sector of data to be recovered.

Element 704 then awaits indicia of the next rotation of the recordable medium as indicated by sensing a sync mark for the sector in question. Generally, rotating recordable media include a sync mark signal to indicate a reliable starting point for each sector. As the recordable medium rotates again to the sector to be recovered, the read channel will first encounter preamble information and the desired sync mark for the sector to be recovered. Upon sensing the start of the desired sector (i.e., the sync mark for that sector), discrete time digital sample values may be accumulated in accordance with the currently programmed counter configuration including the offset counter configuration. The sample values so accumulated are then stored in a sector buffer by operation of 708. Element 710 then determines whether the entire sector has been so sampled utilizing the accumulators as programmed by the control logic features hereof. If not, element 712 reprograms the offset counter to perform a similar accumulation from a different starting point within the sector to be recovered. Processing then continues at element 704 to await a next rotation of the rotating desk recordable medium and operation of the accumulators as then programmed. When element 710 determines that the entire sector has been sampled and the accumulated sampled values stored in the sector buffer by element 708, element 714 is operable to post process the accumulated discrete time sample values to help recover data otherwise unrecoverable utilizing existing data recovery techniques of the disk drive system.

Those of ordinary skill in the art will readily recognize that numerous configurations of the sample counter values and offset counter values may be utilized for accumulating information regarding data pulses representing a sector of data otherwise unrecoverable in a disk drive application. For example, accumulators may be programmed to count discrete time samples as follows:

Offset=X,
Sample Count=Y:
("^" indicates sensing of the sync mark for the sector to be recovered)
$\hat{}< \ldots X \ldots >< \ldots Y \ldots >$
On next drive rotation, Offset=X+Y, Sample Count=Y;
$\hat{}< \ldots X+Y \ldots >< \ldots Y \ldots >$
On next drive rotation, Offset=X+2Y, Sample Count=Y;
$\hat{}< \ldots X<X+2Y \ldots >< \ldots Y \ldots >$
And so on until all of the sector's samples are stored for recovery post processing.

Thus, by iteratively reprogramming the offset counter on each rotation of the disk drive recordable medium, additional error recovery information may be accumulated identifying the position of likely erroneous data in an otherwise unrecoverable sector or block of data from a disk drive. Suitable post processing utilizing such information may then more effectively recover the erroneous information thereby helping prevent loss of data in a disk drive system.

Figure 8:
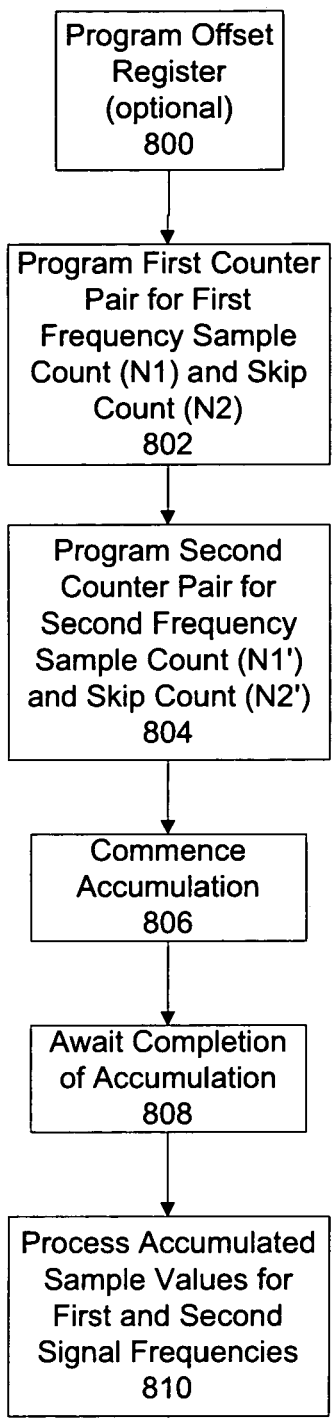

FIG. 8 represents an exemplary method generally suitable for concurrently monitoring two operational parameters of a communication system each associated with a distinct signal frequency sensed through the read channel of the communication system. Whereas prior techniques such as that of Baker could essentially monitor only one frequency associated with an operational parameter, features and aspects hereof allow any number of signal frequencies to be monitored, essentially concurrently, during each rotation of a disk drive rotating storage medium. By contrast, prior techniques would require multiple revolutions of such a rotating storage medium to allow monitoring of the first signal frequency followed by another rotation for monitoring of a second signal frequency.

Monitoring of two or more distinct signal frequencies in a single disk rotation may be useful, for example, to remove the effect of variations in track positioning as compared to prior techniques and structures. In general, prior techniques could only monitor multiple signal frequencies each on a distinct rotation of a disk drive recording medium. Each such distinct rotation could monitor a frequency but at a slightly different position of the read head relative to the intended track location. By contrast, features and aspects hereof permit multiple frequencies to be concurrently monitored during a single rotation of the disk medium under the read head. Monitoring multiple frequencies in a single pass of the disk medium nullifies issues of off-track that would otherwise arise on reading the multiple frequencies on multiple revolutions of the disk medium. The relative differences between the recovered samples in the two or more signal frequencies would give information such as PW50 as well as other head characteristics in the time domain. In general, as applied to any digital communication system, monitoring multiple frequencies concurrently so as to monitor them closely spaced in time reduces the potential impact of environmental affects on the read channel operation.

Element 800 of FIG. 8 is first operable to (optionally) program the offset register to delay commencement of the operation of the digital filter's accumulators until a desired starting point in the sensed samples. Programming of the offset register may allow the monitoring to commence at a preferred position where the desired data signals may be more effectively discerned from other signals encoded or modulated on the disk drive rotating recording medium. Element 802 then programs a first counter pair to correspond to a first frequency signal. As noted above, in one embodiment hereof, a plurality of pairs of counters may be provided in the control logic such that each pair specifies a sample count (N1) of samples to be accumulated within a corresponding plurality of accumulator registers and may also specify a skip count (N2) for a number sample values to be skipped. Element 804 may then program a second counter pair indicating a sample count (N1') and skip count (N2') corresponding to a second frequency signal to be monitored.

The sequence of samples may then accumulate a first set of samples corresponding to the first sample count, may then skip a number of samples corresponding to the first skip count, then accumulate samples corresponding to the second sample count and lastly skip a number of samples specified by the second skip count. Such a sequence may repeat as the rotating recording medium passes under the read head with the read channel generating discrete time sample values therefrom. Once elements 800 through 804 have initialized the programming of the counter registers, element 806 is operable to commence accumulation operation in accordance with the control logic programmed by elements 800 through 804. Element 808 then awaits completion of the programmed accumulation sequence after one or more rotations of the rotating recordable medium. Lastly, element 810 is operable to process the accumulated sample values for both the first and second signal frequencies to thereby measure the intended operational parameters of the disk drive.

For example, to monitor multiple frequencies, counters may be programmed as follows:
Offset=X,
Sample Count 1=N1, Skip Count 1=N2,
Sample Count 2=N1', Skip Count 2=N2'

Figure 9:
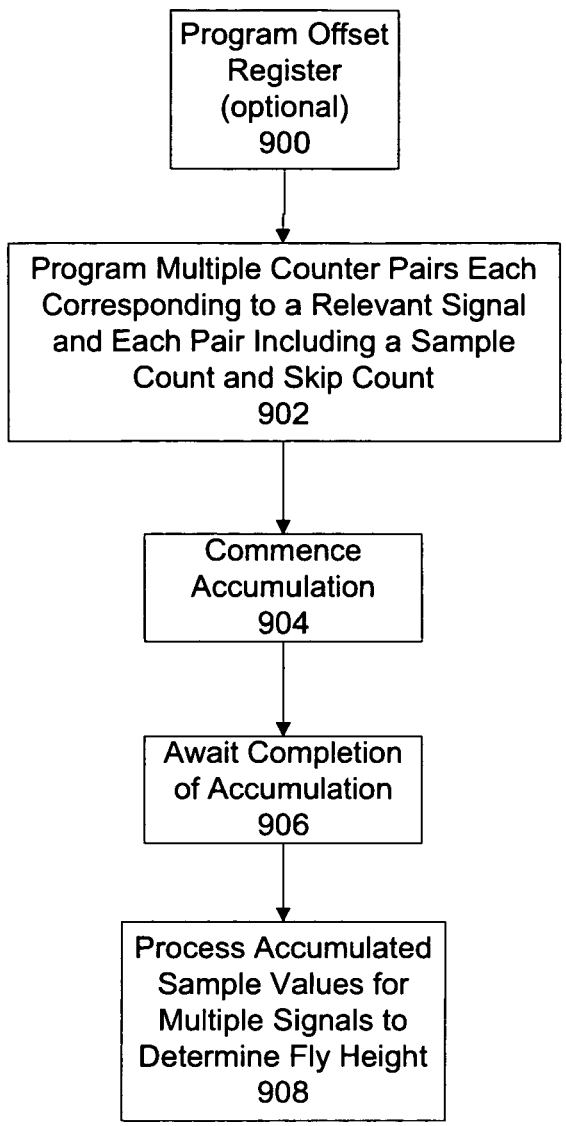

FIG. 9 presents a method similar to that of FIG. 8 but more generally operable to program any number of counter pairs to monitor any corresponding plurality of signal frequencies, each corresponding to one or more operational parameters of the read channel. For example, by monitoring multiple frequencies in a single rotation of the disk drive, flying height adjustments of the read head may be calibrated or adjusted such as in a manufacturing test environment. As generally known in the art, flying height of the read head above the recording surface may be detected by a signal at an appropriate frequency, the frequency of which is approximately proportional to the height of the read head above the rotating recording surface. Well known equations referred to as the "Wallace" equations describe the relationship and may be utilized for determining the flying height of the read head based upon amplitude and frequency of signals generated by the read channel from signals sensed by the read head transducer.

As above with respect to element 800 of FIG. 8, element 900 of FIG. 9 is first operable to optionally program the offset register to delay commencement of the accumulation operation. Element 902 then programs multiple counter pairs with each pair corresponding to a relevant signal frequency to be monitored and each pair including, as noted above, a corresponding sample counter and skip counter value. Element 904 then commences accumulation operation in accordance with the programmed offset and samples/skip counter values programmed by elements 900 through 902. When element 906 detects completion of the intended accumulation operation over one or more rotations of the rotatable recording medium, element 908 is then operable to process the accumulated sample values representing multiple signal frequencies to determine the flying height of the read head above the rotating recording medium. The flying height may be determined in accordance with the Wallace equations as generally known in the art.

Those of ordinary skill in the art will recognize a wide variety of other methods in addition to those described in FIGS. 7 through 9 for measuring one or more particular operational parameters associated with disk drives or other digital communication systems. FIGS. 7 through 9 are therefore intended merely as representative of exemplary methods implementing particular features and aspects hereof to monitor particular exemplary operational parameters of a read channel.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above described embodiments that fall within the scope of the invention. As a result, the invention is not limited to the specific examples and illustrations discussed above, but only by the following claims and their equivalents.

What is claimed is:

1. A circuit for use with a read channel where the read channel produces sequences of discrete time digital sample values for use in a digital communication channel, the circuit including:
   a digital filter adapted to receive the sequences of discrete time digital sample values and to controllably measure a selected operational parameter of a plurality of operational parameters of the digital communication channel; and
   control logic coupled the digital filter adapted to controllably reconfigure operation of the digital filter to measure the selected operational parameter of the digital communication channel and is adapted to sample values for at least two distinct frequency signals as a rotating recording medium in the digital communication channel makes a single rotation relative to a read head.

2. The circuit of claim 1 wherein the digital filter further comprises:
   a plurality of accumulators wherein each accumulator is coupled to receive a current discrete time digital sample value and adapted to accumulate the current discrete time digital sample value with previously received discrete time digital sample values.

3. The circuit of claim 2 wherein the control logic further comprises:
   programmable control logic adapted to controllably generate a plurality of control signals each coupled to a corresponding accumulator of the plurality of accumulators to enable accumulation operation by the corresponding accumulator.

4. The circuit of claim 3 wherein the programmable control logic further comprises:
   an offset counter adapted to delay commencement of operation of the plurality of accumulators until after expiration of an initial offset count in the offset counter.

5. The circuit of claim 3 wherein the programmable control logic further comprises:
   a sample counter for counting a first number of sequential discrete time samples to be accumulated in a corresponding subset of the plurality of accumulators; and
   a skip counter for counting a second number of sequential discrete time samples for which no accumulation is to occur in any of the plurality of accumulators.

6. The circuit of claim 3 wherein the programmable control logic further comprises:
   a plurality of pairs of counters wherein each counter pair is configurable to define a first number of sequential discrete time samples to be accumulated in a corresponding subset of the plurality of accumulators and to define a second number of sequential discrete time samples to be skipped and not accumulated in any of the plurality of accumulators.

7. The circuit of claim 6 wherein the read channel is in a disk drive having the rotating recording surface and the read head, which is positionable above the rotating recording surface and wherein the control logic is further adapted to determine relative flying height of the read head based on the sample values.

8. The circuit of claim 1 wherein the read channel is in a disk drive having the rotating recording surface and the read head which is positionable above the rotating recording surface.

9. The circuit of claim 8 wherein the control logic further comprises:
   a first sample counter for counting a first number of sequential discrete time samples to be accumulated in a first subset of the plurality of accumulators;
   a first skip counter for counting a second number of sequential discrete time samples for which no accumulation is to occur in any of the plurality of accumulators;
   a second sample counter for counting a third number of sequential discrete time samples to be accumulated in a second subset of the plurality of accumulators; and
   a second skip counter for counting a fourth number of sequential discrete time samples for which no accumulation is to occur in any of the plurality of accumulators,
   wherein the first subset of the plurality of accumulators represents a first operation parameter of the communication channel associated with a first frequency signal recorded on the rotating recording surface, and
   wherein the second subset of the plurality of accumulators represents a second operation parameter of the communication channel associated with a second frequency signal recorded on the rotating recording surface.

10. The circuit of claim 8 wherein the control logic is adapted to reconfigure operation of the plurality of accumulators to provide error recovery of a sector of data on the rotating recordable medium.

11. The circuit of claim 10 wherein the control logic further comprises:
   an offset counter adapted to delay commencement of operation of the plurality of accumulators until after expiration of an initial offset count in the offset counter,
   wherein the control logic is further adapted to reprogram the offset counter on each rotation of multiple successive rotations of the rotating recordable medium whereby the error recovery control element is operable to sample a different sequence of discrete time sample values from the sector of data in the plurality of accumulators and is further operable to process each different sequence to recover data therefrom.

12. A method for sensing operational parameters of a read channel in a digital communication system,
   wherein the digital communication system includes a plurality of accumulators coupled to the read channel to receive a sequence of discrete time sample valued values from the read channel, and
   wherein the digital communication system further includes control logic coupled to the plurality of accumulators to controllably enable and disable each accumulator of the plurality of accumulators to accumulate a next discrete time sample value of the sequence of discrete time sample values,
   wherein the method comprises:
   programming the control logic to operate the plurality of accumulators to measure a selected operational parameter of a plurality of operational parameters of the read channel, which comprises programming the control logic to reconfigure operation of the plurality of accumulators to provide error recovery of a sector of data on a rotating recordable medium within the digital communication channel; and
   operating the plurality of accumulators to sense the selected operational parameter of the read channel.

13. The method of claim 12 wherein the read channel is in a disk drive having the rotating recording surface and a read head positionable above the rotating recording surface.

14. The method of claim 13 wherein the control logic includes a programmable offset counter and wherein the step of programming to provide error recovery further comprises:
   repeatedly reprogramming the offset counter on each rotation of multiple successive rotations of the rotating recordable medium to thereby accumulate a different sequence of discrete time sample values from the sector of data in the plurality of accumulators; and
   processing each different sequence to recover data therefrom.

15. The method of claim 12 wherein the control logic includes a pair of counters including a sample counter for counting a first number of sequential discrete time samples to be accumulated in a corresponding subset of the plurality of accumulators, and a skip counter for counting a second number of sequential discrete time samples for which no accumulation is to occur in any of the plurality of accumulators,
   wherein the step of programming further comprises:
   programming the pair of counters with a sample count value in the sample counter and with a skip count value in the skip counter to thereby measure the select one operational parameter.

16. The method of claim 15 wherein the control logic further comprises a second pair of counters including a second sample counter for counting a third number of sequential discrete time samples to be accumulated in a corresponding second subset of the plurality of accumulators, and includes a second skip counter for counting a fourth number of sequential discrete time samples for which no accumulation is to occur in any of the plurality of accumulators,
   wherein the step of programming further comprises:
   programming the second pair of counters with a second sample count in the second sample counter and with a second skip count in the second skip counter to thereby monitor an operational parameter,
   wherein the values accumulated in the subset of accumulators associated with the first pair corresponds to a first signal frequency associated with the read channel and wherein the values accumulated in the subset of accumulators associated with the second pair of accumulated with a signal frequency.

17. The method of claim 12 wherein the control logic includes a plurality of pairs of counters each pair of counters including a sample counter for counting a corresponding number of sequential discrete time samples to be accumulated in a corresponding subset of the plurality of accumulators and each pair of counters further including a skip counter for counting a corresponding number of sequential discrete time samples for which no accumulation is to occur in any of the plurality of accumulators,
   wherein the step of programming further comprises:
   programming each pair of counters with a sample count value in the corresponding sample counter of each pair and with a skip count value in the corresponding skip counter to thereby measure the selected operational parameter wherein the selected operational parameter is associated with a signal frequency associated with the corresponding subset of accumulators of each corresponding pair of counters.

18. A method for sensing operational parameters of a read channel in a digital communication system,
wherein the digital communication system includes a plurality of accumulators coupled to the read channel to receive a sequence of discrete time sample valued from the read channel, and
wherein the digital communication system further includes control logic coupled to the plurality of accumulators to controllably enable and disable each accumulator of the plurality of accumulators to accumulate a next discrete time sample value of the sequence of discrete time sample values,
wherein the method comprises:

programming the control logic to operate the plurality of accumulators to measure a selected operational parameter of a plurality of operational parameters of the read channel, wherein the plurality of accumulators sample values for at least two distinct frequency signals as a rotating recording medium in the digital communication system makes a single rotation relative to a read head; and operating the plurality of accumulators to sense the selected operational parameter of the read channel.

* * * * *